United States Patent [19]
Gober

[11] Patent Number: 5,487,235
[45] Date of Patent: Jan. 30, 1996

[54] SUPPORT APPARATUS FOR FENCING

[76] Inventor: Glenn D. Gober, 27 President Ave., Rutledge, Pa. 19070

[21] Appl. No.: 112,677

[22] Filed: Aug. 26, 1993

[51] Int. Cl.⁶ ................................................ A01G 17/06
[52] U.S. Cl. .................... 47/46; 47/47; 52/155; 248/219.4
[58] Field of Search .................... 47/46 R, 47 L; 52/155, 156; 248/219.3, 219.4

[56] References Cited

U.S. PATENT DOCUMENTS

| | | | |
|---|---|---|---|
| 2,173 | 9/1861 | Beardsley | 47/46 R |
| 235,709 | 12/1880 | Smith et al. | 52/156 |
| 369,371 | 9/1887 | Tourgée | 52/156 |
| 1,142,233 | 6/1915 | Bryning | |
| 1,153,380 | 9/1915 | Fussell | 52/155 |
| 1,250,617 | 12/1917 | Montel | 52/155 |
| 2,074,688 | 3/1937 | Friend | |
| 2,600,666 | 6/1952 | Martensen | |
| 2,651,502 | 9/1953 | Carvelo et al. | |
| 2,777,673 | 1/1957 | May, Jr. et al. | |
| 3,423,072 | 1/1969 | Bernstein | |
| 3,503,580 | 3/1970 | Levy | 248/219.4 |
| 4,185,424 | 1/1980 | Streit | 52/155 |
| 4,325,529 | 4/1982 | Seebinger | 248/219.4 |
| 4,503,636 | 3/1985 | Stuckey | 47/47 L |
| 4,773,437 | 9/1988 | Glutting | |
| 5,029,819 | 7/1991 | Kane | |
| 5,058,337 | 10/1991 | O'Connor | 52/155 |

FOREIGN PATENT DOCUMENTS

| | | | |
|---|---|---|---|
| 2815791 | 10/1979 | Germany | 47/47 L |
| 13591 | of 1906 | United Kingdom | 47/47 L |
| 295737 | 8/1928 | United Kingdom | 47/47 L |
| 613721 | 12/1948 | United Kingdom | 47/47 L |

*Primary Examiner*—Terry Lee Melius
*Assistant Examiner*—Joanne C. Downs
*Attorney, Agent, or Firm*—Robert S. Lipton; Lipton & Stapler

[57] ABSTRACT

An improved ground stake apparatus for the support of small garden fences used to protect flower beds, seedlings and the like. The invention is comprised of a stake adapted with a plurality of incrementally spaced apertures through which one or more removable U-shaped bridge members are inserted to form channels for the retention of horizontal wires of conventional fencing. Hour-glass shaped clips are also provided to secure the bridge members in place at the desired elevation along the elongate shaft of the stake. Additional features of the invention include an enlarged head having elevated nubs to reduce hammer slippage while driving the stake and a ventral fin attached along the bottom of the shaft for the prevention of both axial and lateral movement of the stake once inserted into the ground.

5 Claims, 2 Drawing Sheets

SUPPORT APPARATUS FOR FENCING

FIELD OF THE INVENTION

The subject invention is directed to a support apparatus for small fences in general, and to a novel ground stake for the support of fences designed to protect seedlings and the like, in particular.

BACKGROUND OF THE INVENTION

Conventional fencing used to encircle and protect small seedlings, flowers and plants is typically constructed of metal wire and is relatively inexpensive, light weight and highly compactable into a rolled configuration for storage. Yet, despite the many advantages associated with fencing of this sort, they tend to suffer from significant shortcomings making their use less desirable.

Seedling fencing typically has a plurality of incrementally spaced downward projections which are intended to be inserted into the ground in order to hold the fence in place. In practice, however, the metal wires frequently bend when their insertion into the ground is attempted because of their relatively long length and small diameter. Moreover, difficulty of insertion is exacerbated when the ground is hard or when the wire makes contact with small obstructions in the soil because the thin wires simply lack the structural fortitude required to be driven through these impediments. Additionally, the degree of protection actually afforded by conventional fencing is often unsatisfactory because their thin wire support extensions are easily uprooted and overturned by exposure to moderate winds or even the slightest contact with gardening implements or an accidental kick, for instance.

Heretofore, users of such fences have attempted to resolve these problems by driving stakes or posts into the ground adjacent the fence and secure them together with twine or wire. This remedy, while somewhat effective, requires considerable time and effort to cut appropriate lengths of string, one at a time, to tie knots, cut off loose ends, etc., and is considered by many to lack aesthetic appeal.

It is clear that a significant need exists for a solution to the above described shortcomings without sacrificing the many advantages associated with conventional garden fencing. The subject invention completely obviates all of these shortcomings by providing a separate support apparatus to which conventional fencing may be attached.

SUMMARY OF THE INVENTION

The subject invention more specifically relates to an improved ground stake apparatus adapted with a plurality of incrementally spaced apertures through which one or more removable U-shaped bridge members are inserted to form channels for the retention of conventional fencing. Hourglass shaped clips are also provided to secure the bridge members in place at the desired elevation along the elongate shaft of the stake.

Additional features of the invention include an enlarged head having elevated nubs to reduce hammer slippage while driving the stake and a ventral fin attached along the bottom of the shaft for the prevention of both axial and lateral movement of the stake once inserted into the ground.

It is, therefore, a primary object of the subject invention to provide a novel ground stake capable of immediate attachment to conventional fencing for the purpose of providing support for same.

Another object of the subject invention is to obviate the shortcomings of conventional garden fencing without sacrificing its many advantages by providing an improved means of support at little expense.

It is also an object of the present invention to provide an improved ground stake of simple, but sturdy construction and capable of quick and easy attachment to conventional garden fencing without the use of strings or wire or other means which are equally tedious to apply.

Other objects and advantages of the present invention will be apparent upon reference to the accompanying description when taken in conjunction with the following drawings in which similar reference numerals or characters designate similar parts.

DETAILED DESCRIPTION OF THE PREFERRED EMBODIMENT

Figure 1:
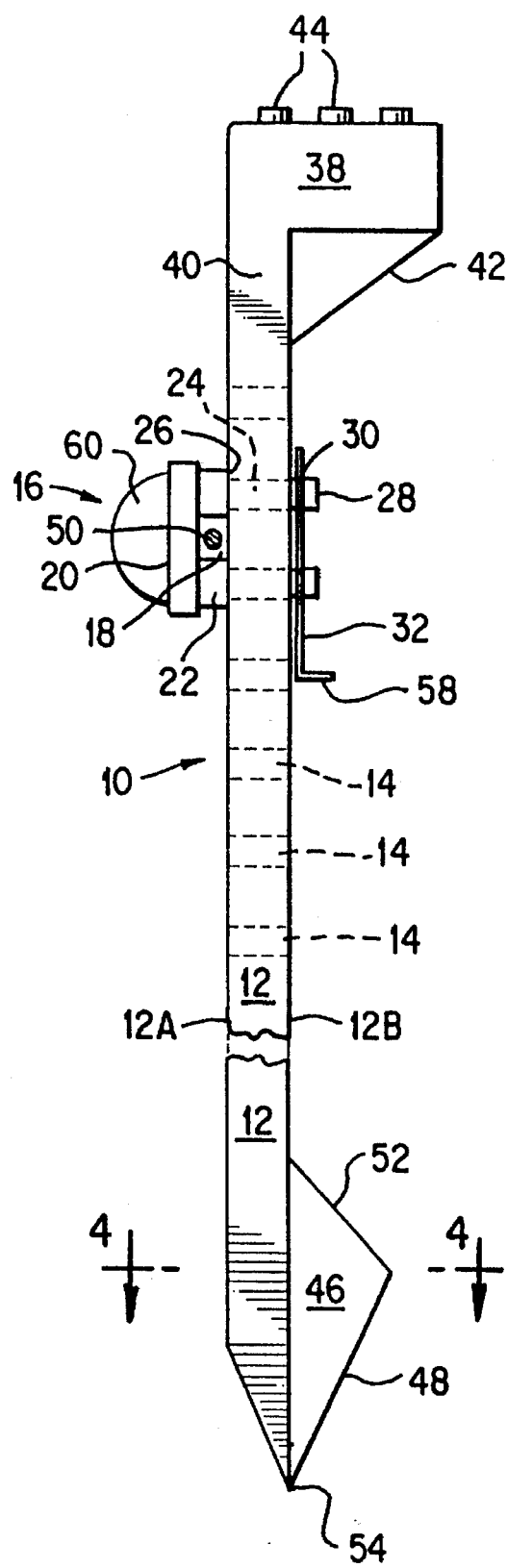
FIG. 1 is a side view of the subject support apparatus, portions of which are depicted in phantom line and broken view to best illustrate its design.

Reference is now made to FIG. 1 in which there is illustrated a side view of the preferred embodiment of the subject support apparatus designated generally by reference numeral 10. Stake 10 is comprised, in part, of an elongate shaft 12 having front and rear faces 12A and 12B, respectively.

Figure 2:
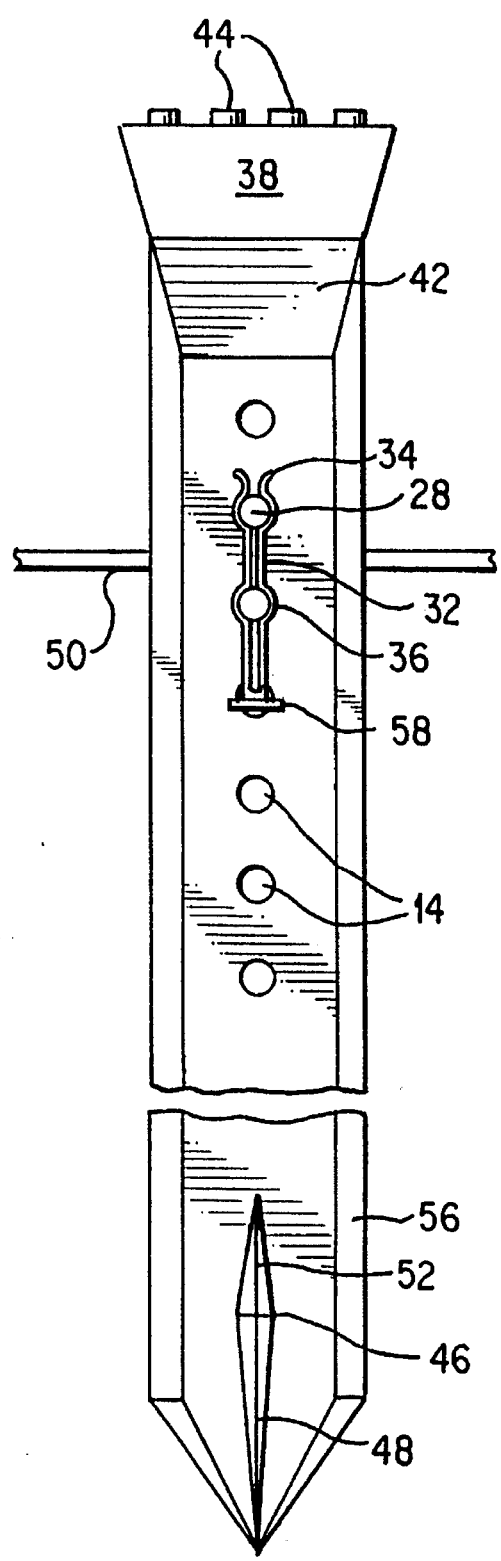
FIGS. 2 and 3 are rear and plan views, respectively, of the invention of FIG. 1 as applied to a section of garden fencing.

As may best be appreciated by reference to FIG. 2, shaft 12 has disposed therethrough a plurality of apertures 14 spaced at equidistant increments along its length. At least one separate U-shaped bridge member 16 is also provided and is inserted through any two adjacent apertures 14 to form a partial enclosure or channel 18 through which portions of fencing 50 are received as described in greater detail below.

Figure 5:
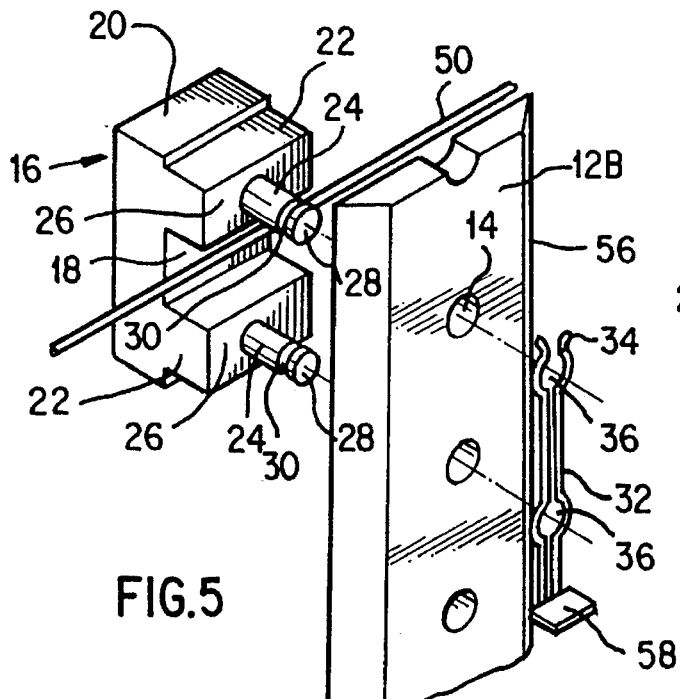
FIG. 5 is a detailed prospective view of the bridge member of the subject apparatus.
Figure 6:
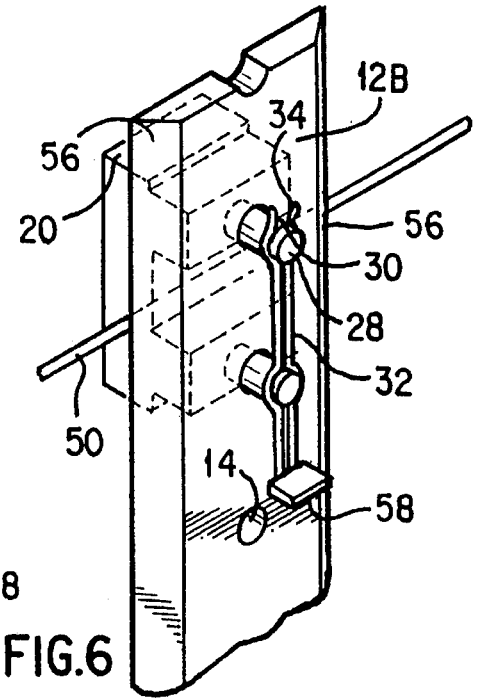
FIG. 6 is a detailed prospective view of the subject support apparatus as applied to a section of fence.

Referring now to FIG. 5, each bridge member 16 is more particularly comprised of a vertically oriented rectangular spine 20 having two rectangular legs 22 extending perpendicularly therefrom at its upper and lower extremes in parallel fashion and a semi-circular handle. Each leg 22, in turn, has a cylindrical pin 24 extending from its length having a diameter slightly smaller than that of apertures 14. Accordingly, each pin 24 of a bridge member 16 may be slidably received through an aperture 14 until shoulders 26 of legs 22 make contact with front face 12A of shaft 12 (FIG. 1). In this position, tips 28 of pins 24 extend beyond the surface of rear face 12B such that detents 30 encircling pins 24 are exposed. To facilitate insertion and removal of pins 24 into and from apertures 14, spine 20 may be adapted with a handle 60 of semi-circular design (FIG. 1) or other suitable configuration capable of enhancing manageability of bridge member 16.

Referring once again to FIGS. 1 and 2, it can be observed that each bridge member 16 has a corresponding clip 32 for the purpose of securing the bridge to shaft 12 of stake 10. Clips 32 are of a generally hour-glass shape having ends 34 which taper outward to facilitate passage of the clip over detents 30 until both tips 28 of bridge 16 are simultaneously positioned within loops 36. Once clip 32 is positioned so as to be closed about detents 30, displacement of the former from the latter is prevented. Passage of clip 32 across detents 30 of tips 28 is facilitated by thumb rest 58. The spring-like construction of each clip 32 provides the force necessary to be firmly secured about detents 30. It should also be obvious that the distance between the center of loops 36 is equal to the distance between the center of any two apertures 14 so that each pin 24 may be held within a loop 36 at the same time. Other suitable means of securing bridge members 16 to shaft 12 may also be employed.

Figure 3:
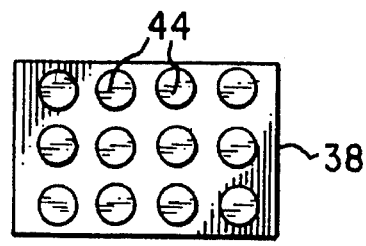

Referring now to FIG. 3, a rectangular head 38 is fixedly mounted to shaft 12 in perpendicular orientation to provide a striking surface for insertion of stake 10 into the ground. Head 38 is reinforced about the neck 40 of shaft 12 by block 42 (FIGS. 1 and 2) which is tapered downwardly and inwardly to direct driving forces to the shaft. In another embodiment head 38, block 43 and shaft 12 may be of unibody construction rather than separate elements. A plurality of slightly protruding nubs 44 are also provided in a grid-like pattern to reduce hammer slippage during driving and, further, to reduce vibration created by blows to the head.

Figure 4:
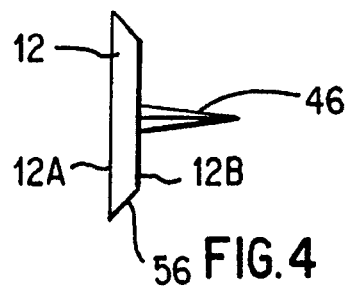
FIG. 4 is a sectional view of the invention of FIG. 1 taken along line 4—4.

Another feature of the subject support apparatus clearly depicted in FIGS. 1 and 2 is a ventral fin 46 which projects outwardly from the rear face 12B of shaft 12 at its terminal end. Fin 46 is triangular in shape having tapered edges 48 and 52 to facilitate insertion and removal, respectively of stake 10 from the ground. Similarly, shaft 12 terminates in tapered point 54 to further provide ease of insertion. FIG. 4 is a cross sectional view of shaft 12 taken along line 4—4 of FIG. 1 and reveals another functional aspect of shaft 12 and fin 46, namely a three sided configuration which acts to stabilize the stake in the ground by reducing axial rotation as well as forward and lateral movement. Note also that shaft 12 has a trapezoidal shape providing slimmer edges 56 to further facilitate stake insertion.

In operation, stake 10 is driven into the ground in the conventional manner at a location adjacent fence 50 with the front face 12A of shaft 12 facing the fence. Insertion is carried out until fin 46 of shaft 12 is two or three inches below the ground's surface or until the stake reaches a depth sufficient to provide for its immobility.

Figure 7:
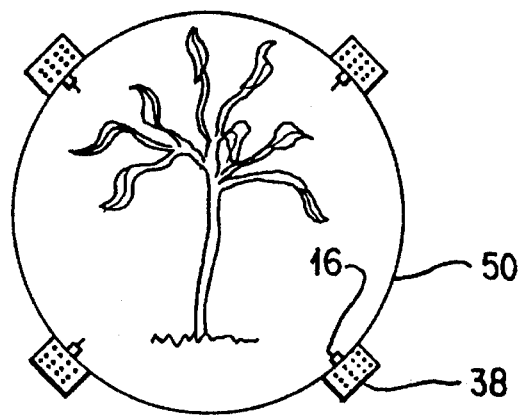
FIG. 7 is a schematic plan view of a plurality of the subject apparatus supporting a fence which in turn surrounds a small plant.

Once the stake is inserted firmly in the ground, one or more horizontal wires of fence 50 are placed between the legs 22 of bridge member 16 (FIG. 5) and pins 24 are then inserted through the closest two apertures 14 of stake 10. Fence 50 may now be secured firmly to stake 10 within channel 18 by application of clip 32 to the tips 28 of pins 24 as more fully described above. More than one bridge member 16 may be applied depending on the height of fence 50 or the degree of fence stability desired. Similarly, the subject support apparatus may be constructed with shorter or longer shaft lengths to suit the needs of a particular situation. It is intended that at least three or four stakes 10 be used for a simple circular enclosure of a small plant or seedling as schematically illustrated in FIG. 7.

Although the present invention has been described with reference to the particular embodiments herein set forth, it is understood that the present disclosure has been made only by way of example and that numerous changes in details of construction may be resorted to without departing from the spirit and scope of the invention. Thus, the scope of the invention should not be limited by the foregoing specifications, but rather only by the scope of the claims appended hereto.

What is claimed is:

1. A support apparatus for garden fencing, comprising:
   (a) an elongate shaft having a plurality of incrementally spaced apertures therethrough along the length of said shaft; said apertures being adjacent to one another;
   (b) a U-shaped bridge member for securing a section of fence to said shaft; said bridge member having two cylindrical pins and a closed section therebetween; said pins of said bridge member being adapted to be slidably received within said apertures such that said section of fence is disposed between the closed section of said bridge member and said shaft; and
   (c) a clip adapted to engage said pins of said bridge member for securing it to said shaft.

2. The support apparatus of claim 1, wherein said pins are adapted with detents about the circumference of said pins for the purpose of receiving said clip and preventing its displacement from the ends of said pins.

3. A support apparatus for garden fencing, comprising:
   (a) an elongate shaft having a plurality of incrementally spaced apertures therethrough along the length of said shaft; said apertures being adjacent to one another;
   (b) a U-shaped bridge member for securing a section of fence to said shaft; said bridge member having two cylindrical pins and a closed section therebetween; said pins of said bridge member being adapted to be slidably received within said apertures such that said section of fence is disposed between the closed section of said bridge member and said shaft; and
   (c) a clip adapted to engage said pins of said bridge member for securing it to said shaft; said clip having a generally hour-glass shape and an open end, said open end of which is tapered outwardly to facilitate passage of said clip about the pins of said bridge member.

4. A support apparatus for garden fencing, comprising:
   (a) an elongate shaft having a plurality of incrementally spaced apertures therethrough along the length of said shaft; said apertures being adjacent to one another;
   (b) a U-shaped bridge member for securing a section of fence to said shaft; said bridge member having two cylindrical pins and a closed section therebetween; said pins of said bridge member being adapted to be slidably received within said apertures such that said section of fence is disposed between the closed section of said bridge member and said shaft; and
   (c) a clip adapted to engage said pins of the bridge member for securing it to said shaft; said clip being adapted with a thumb rest extending perpendicularly from a closed end of said clip for the purpose of facilitating passage of said clip about the pins of said bridge member.

5. A support apparatus for garden fencing, comprising:
   (a) an elongate shaft having a plurality of incrementally spaced apertures therethrough along the length of said shaft; said apertures being adjacent to one another;
   (b) a U-shaped bridge member for securing a section of fence to said shaft; said bridge member having two cylindrical pins and a closed section therebetween; said pins of said bridge member being adapted to be slidably received within said apertures such that said section of fence is disposed between the closed portion of said bridge member and said shaft; said bridge member having a handle to facilitate insertion and removal of said bridge member into and out of said shaft; and (c) a clip adapted to engage said pins of the bridge member for securing it to said shaft.

* * * * *